Aug. 4, 1953     J. L. ANDERSSON     2,647,335
SIGN
Filed Sept. 22, 1949
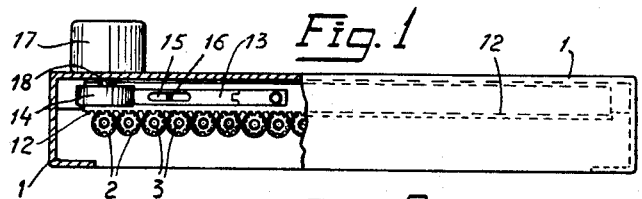
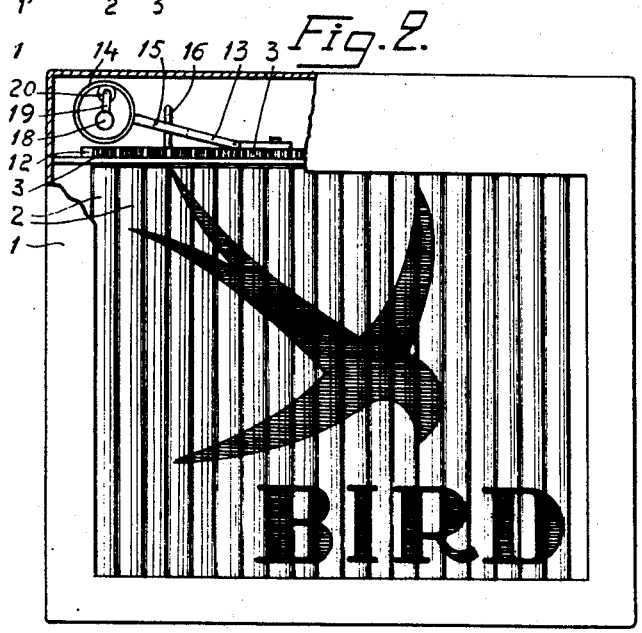
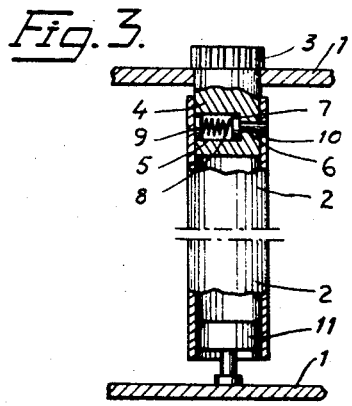
INVENTOR.

Patented Aug. 4, 1953

2,647,335

UNITED STATES PATENT OFFICE 2,647,335

SIGN

Jonas Leopold Andersson, Hudiksvall, Sweden

Application September 22, 1949, Serial No. 117,201
In Sweden August 11, 1945

2 Claims. (Cl. 40—76)

1

The present invention refers to displaying devices and more particularly relates to a changeable displaying device for an intermittent display of two different signs, the first of which is presented on the one and the second on the other half of a row of mechanically rotatable rod-like members mounted in close juxtaposition in a frame.

The invention is principally distinguished by the combination of a row of tubular members, a pinion terminating each one of said tubular members, a toothed rack in mesh with all of said pinions, a link member extending substantially in the same direction as said rack and pivoted at one end thereof to said rack and fixed at the other end thereof to an annular member, a motor arranged on the frame and having a protruding shaft entering said annular member, a transverse arm secured on said shaft within said annular member and having a length exceeding the internal radius of said annular member, and a roller on the free end of said arm in rolling contact with the internal peripheral portion of the annular member, at the rotation of said shaft, said roller having an outer diameter considerably smaller than the internal diameter of said annular member so as to actuate said annular member in the direction of said link member at intervals only, a reciprocating movement thus being imparted to said rack and an intermittently rotary movement to said pinions and tubular members.

The annexed drawing illustrates a preferred embodiment of the invention, Fig. 1 showing the displaying device according to the invention viewed from above, partly in section, and Fig. 2 showing a front view of the same, also partly in section. Fig. 3 shows details in section on a larger scale.

In the drawing, the numeral 1 designates the members forming parts of a frame or a casing, which is practically completely open at the front side of the sign. Between two horizontal members in the casing there are arranged a number of mutually adjacent, rod-shaped members 2, preferably consisting of metal tubes. As will be seen from Fig. 3, the upper, open end of each tube may be pushed over a hub or shaft pivot 4 extending from a toothed wheel 3. In the pivot 4 there is made a diametral bore 5, into which is inserted a pin 6 provided with a flange 7. Bearing upon the said flange is one end of a helical spring 8, which urges the end of the pin 6 outside the circumference of the pivot 4. The flange 7, which is located in the same enlarged

2 portion of the bore 5 as the spring 8, bears upon a supporting edge provided in the said bore. A stopper 9 serves to support the other end of the spring 8. The free end of the pin 6 may spring into a hole 10 made in the tube 2, which is thus easily mounted in its place only by being pushed over the pivot 4. This arrangement has the advantage that the tube 2 can be adequately connected with a toothed wheel in a simple manner. Guides 11 are fastened on a lower horizontal member of the casing 1, over which guides the lower ends of the tubes can be pushed. Thus, the rods or the tubes 2, as will appear from the drawing, will enter into an upper horizontal member of the casing 1 and will be held in the vertical direction by the guides 11.

The toothed wheels 3, which have smaller diameter than the cross section of the rods, are all in tooth mesh with one and the same rack 12. To this rack, which is displaceably arranged on the said upper, horizontal member of the casing 1, there is pivoted one end of a link member 13, the other end of which is fixed to an annular member 14. A longitudinally extending slot 15 is provided in the link member 13, a stud 16 fixed to the rack 12 entering said slot. Mounted on the casing 1 is a driving motor 17, the outgoing shaft 18 of which extends into the part 14 and to the end of which is fixed an arm 19 having a roller 20, which abuts against the internal peripheral portion of the member 14.

At the rotation of the driving shaft 18 the arm 19 with the roller 20 is swung around, thereby causing the annular member 14, and thus any point on the periphery of said member, to move along a path, the size of which is determined by the length of the arm 19 relative the radius of the annular member and the shape of which is influenced by the inertia of the tubular members 2, the pinions 3, the rack 12, the link member 13 and the annular member proper, by the friction in the link of member 13, and by the very fact that the arm 19 or the roller 20 is not secured to the member 14, a certain resilience or yielding thus existing between the latter parts. The link member 13 being pivoted to the rack 12, said link member will take up the substantially vertical components of the movement and transmit only the substantially horizontal components to the rack. In consequence, the picture exposed will be non-moving during the substantially vertical movement of the annular member and be changed when the latter performs a substantially horizontal movement.

The path of motion of the annular member can be traced as follows: Starting the rotation from the highest position of the roller 20 as shown in Fig. 2 the roller will not at once displace the member 14 in the horizontal direction but lift it still a little because of the inertia and friction to be overcome and the slight resilience between the parts. During this interval, the picture will be non-moving. As the arm 19 continues towards its horizontal position, the said resistance is overcome, the member 14 being displaced horizontally and transmitting this movement to the rack 12, the picture thus being changed. During the continued swinging of the arm 10 towards its second vertical position (the lowest position of the roller 20), and until slightly past the latter position, the annular member will, under influence of the above-mentioned forces, move substantially vertically downwards. In consequence, the rack will not be actuated and the new picture will rest non-moving. As the arm 19 continues towards its other horizontal position, the annular member 14 is again displaced horizontally and actuates the rack in the opposite direction to the first rack movement so that the picture is changed anew. Then the arm 19 proceeds towards and past its upright position, for the above-mentioned reasons substantially lifting the annular member, during which interval the picture displaced will remain at rest. At its movements, the rack 12 causes the pinions 3 to perform half a revolution, the tubular members 2 being rotated correspondingly.

Fig. 2 shows an example of how the rods may be provided with coloured sections, in this case constituting a conventionalized bird and the word "Bird." When the rods rotate, this disappears gradually and other coloured sections appear, which together form an entirely different picture, a text or the like.

Of course, the sign should be visible also after the darkness has come on, and this may be effected in different ways, for instance by placing light fixtures around the rods. Further, the rods may be produced of transparent material of a suitable kind, and appropriate illuminating means may be inserted within the rods.

It must be mentioned as an example of the great effect that can be obtained by means of a sign according to the invention, that the same may be made in very large dimensions so as to cover a whole house gable, the larger part of a sloping roof etcetera. In the latter case an amazing effect is obtained if for one of their angular positions the rods are painted in such a way (for instance as roofing-tiles) that the entire sign becomes invisible because it matches the appearance of the roof. In the other angular position of the rods, the impression may be given that the roof disappears completely and forms an illuminated advertising sign of large dimensions.

The above description and the drawings are only examples of the usability of the invention. Of course, several different embodiments of the constructions forming the sign are conceivable within the scope of the invention.

Having now described my invention, what I claim as new and desire to secure by Letters Patent is:

1. A changeable displaying device for an intermittent display of two different signs, the first of which is presented on the one and the second on the other half of a row of mechanically rotatable rod-like members mounted in close juxtaposition in a frame, comprising, in combination, a row of tubular members, a pinion terminating each one of said tubular members, a toothed rack in mesh with all of said pinions, a link member extending substantially in the same direction as the rack and pivoted at one end thereof to said rack and fixed at the other end thereof to an annular member, a motor arranged on the frame and having a protuding shaft entering said annular member, a radially extending arm secured on said shaft within said annular member and having a length exceeding the internal radius of said annular member, and a roller on the free end of said arm rolling in contact with the internal peripheral portion of the annular member at the rotation of said shaft and having an outer diameter considerably less than the internal diameter of said annular member so as to actuate said annular member in the direction of said link member at intervals only, a reciprocating movement thus being imparted to said rack and an intermittently rotary movement to said pinions and tubular members.

2. A changeable displaying device as claimed in claim 1, wherein said link member interconnecting said rack and said annular member is provided with a slot receiving a guide pin secured to said rack.

JONAS LEOPOLD ANDERSSON.

References Cited in the file of this patent

UNITED STATES PATENTS

| Number | Name | Date |
|---|---|---|
| 1,374,921 | Houston | Apr. 19, 1921 |
| 1,445,874 | Diamond | Feb. 20, 1923 |
| 1,555,690 | Mitnitzky | Sept. 29, 1925 |
| 1,718,625 | Bartoletti | June 25, 1929 |
| 1,765,073 | Hester | June 17, 1930 |